United States Patent [19]

Hagiwara et al.

[11] Patent Number: 5,431,418
[45] Date of Patent: Jul. 11, 1995

[54] METAL GASKET

[75] Inventors: Yoshiyuki Hagiwara, Okazaki; Osamu Jinno, Nagoya; Yukio Kawai, Toyota; Kazuya Nakata, Toyota; Takeshi Kitamura, Toyota, all of Japan

[73] Assignees: Taiho Kogyo Co., Ltd.; Toyota Jidosha Kabushiki Kaisha, both of Toyota, Japan

[21] Appl. No.: 981,090

[22] Filed: Nov. 24, 1992

[30] Foreign Application Priority Data

Nov. 25, 1991 [JP] Japan .................. 3-336303
Nov. 25, 1991 [JP] Japan .................. 3-336311

[51] Int. Cl.⁶ .............................................. F16J 15/08
[52] U.S. Cl. ........................... 277/235 B; 277/180
[58] Field of Search ............... 277/180, 235 A, 235 B, 277/235 R, 227, 229

[56] References Cited

U.S. PATENT DOCUMENTS

| | | | |
|---|---|---|---|
| 2,970,322 | 7/1976 | Stecher et al. | 277/235 B |
| 4,721,315 | 1/1988 | Ueta | 277/235 B |
| 4,728,110 | 3/1988 | Nakasone | |
| 4,826,708 | 5/1989 | Udagawa | 277/235 B |
| 5,110,630 | 5/1992 | Abe et al. | 277/235 B |

FOREIGN PATENT DOCUMENTS

| | | | |
|---|---|---|---|
| 58-200858 | 11/1983 | Japan | 277/235 B |
| 0121258 | 7/1984 | Japan | 277/235 B |
| 59-188955 | 12/1984 | Japan | |
| 61-14748 | 1/1986 | Japan | |
| 61-41960 | 3/1986 | Japan | |
| 63-45456 | 3/1988 | Japan | |
| 63-48061 | 4/1988 | Japan | |
| 0246572 | 10/1988 | Japan | 277/235 B |
| 63-180770 | 11/1988 | Japan | |
| 64-8556 | 1/1989 | Japan | |
| 648556 | 1/1989 | Japan | |
| 1141354 | 1/1989 | Japan | |
| 64-35057 | 2/1989 | Japan | |
| 1104953 | 4/1989 | Japan | |
| 1146064 | 10/1989 | Japan | |
| 26855 | 1/1990 | Japan | |
| 2118274 | 2/1990 | Japan | |
| 483975 | 3/1992 | Japan | |

Primary Examiner—Daniel G. DePumpo
Attorney, Agent, or Firm—Sughrue, Mion, Zinn, Macpeak & Seas; Richard C. Turner; Grant K. Rowan

[57] ABSTRACT

A metal gasket having first and second base plates made of metal. In each base plate, at least an opening is defined and a bead is formed around the opening. The second base plate is disposed in parallel with the first base plate with the tip ends of the beads of the first and second base plates facing each other. An annular metallic shim is secured to the first base plate at the side of the bead between the inner periphery of the bead and the opening. And, a resilient sealing member is deposited on the second base plate at the side of the bead around the outer periphery of the bead. A non-vulcanized coating layer of fluoro rubber containing no vulcanizing agent may be deposited on the entire surface of the second base plate at the side of the bead. A vulcanized fluoro rubber may be deposited on the non-vulcanized coating layer at the side of the bead around the outer periphery of the bead.

23 Claims, 6 Drawing Sheets

F I G. 1
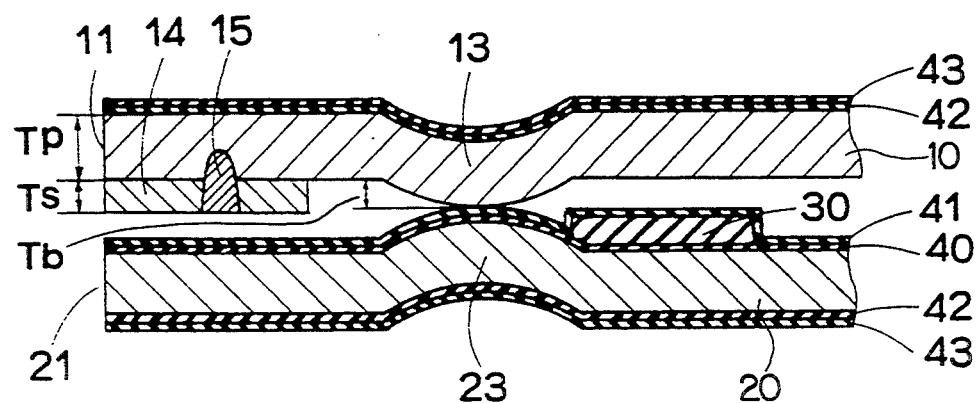

METAL GASKET

BACKGROUND OF THE INVENTION

1. Field of the Invention

The present invention relates to a metal gasket designed to be, and more particularly to a metal gasket disposed between a cylinder head and a cylinder block of an internal combustion engine, and formed of a metallic base plate defining a plurality of openings and having beads formed therearound.

2. Description of the Related Art

It is well known that a gasket maybe disposed between connecting members to seal a clearance therebetween. For instance a cylinder head gasket is disposed, between a cylinder head and a cylinder block of an internal combustion engine. With respect to this gasket, a metal gasket formed of a metallic plate has been widely used. For example, a gasket having a metallic base plate which defines a plurality of openings for passing therethrough pressurized gas such as burnt gas, and which forms beads around the openings to ensure a high sealing pressure against the connecting members is known.

Japanese Utility model Laid-Open Publication No. 59-188955 discloses a sealing pressure adjusting plate whose thickness is smaller than the height of the bead, and which is disposed adjacent to the bead, so as to avoid a reduction in sealing pressure due to undesirable plastic deformation of the bead caused by a clamping force applied thereto. Likewise, it is proposed to form a thick portion on the base plate adjacent to the bead. With respect to this thick portion, there are disclosed a thick portion formed by metal plating in Japanese Utility model Laid-Open Publication NO.61-14748, an auxiliary plate adhered or welded on the base plate in Japanese Utility model Laid-Open Publication No. 2-6855, and a coated stopper (corresponding to the thick portion) with plastics or the like impregnated therein for providing a sealing effect in Japanese Patent Laid-Open Publication No. 64-35057. Also, Japanese Utility model Laid-Open Publication No. 64-8556 discloses a cylinder head gasket provided with a thick portion disposed at the inner side of a bead, and provided with a soft sealing member disposed at a border portion at the outer side of the bead.

As for a spacer such as the above-described sealing pressure adjusting plate, thick portion or the like, which will adjust the bead to be compressed and deformed for functioning as a sealing member, it is preferable to employ a material having a sealing property so as to function as a sealing member itself. In view of various factors such as assembling ability, thickness control, manufacturing cost and the like, it is preferable to secure a metallic ring around the peripheral portion of the opening defined in the base plate.

However, if the metallic ring is secured to the base plate by welding or the like, the base plate will possibly be distorted. The base plate is to be further provided with the sealing member, as described above, so that if the base plate is distorted, it will be difficult to deposit the sealing member at an appropriate position, and the productivity will be decreased.

With respect to the metal gasket as shown in FIG. 6 of the publication No. 64-35057, wherein a couple of base plates of the same configuration forming beads are disposed with the tip ends of the beads facing each other, it is possible to decrease a displacement of the bead of each base plate, so that its anti-fatigue property will be improved. In the publication No. 64-35057, a stopper is formed by spraying and then impregnated with resin, so that it is different from the metallic ring to be secured in terms of property, problems in manufacturing and assembly, or the like. If the metallic ring is substituted for the stopper disclosed in the publication, the sealing member will be formed on the base plate, to which the metallic ring is secured, around the outer periphery of the bead at the protruded side thereof. Therefore, when the sealing member is disposed on the base plate, the same problem as described above will be caused. In addition, since it has been so arranged to dispose an intermediate plate, more material will be necessitated and the thickness as a whole will become greater, in comparison with the art preceding the above publication. As a countermeasure, it is not appropriate to merely remove the intermediate plate, as can be understood in view of the publication in which any structure without the intermediate plate has not been disclosed.

Japanese Utility model Laid-Open Publication No. 61-41960 discloses a metal gasket which deposits on a base plate a vulcanized first coating layer and further deposits a non-vulcanized second coating layer to provide two coating layers. Also, Japanese Utility model Laid-Open Publication No. 1-146064 discloses a metal gasket having a base plate, on which an unvulcanized coating layer including a vulcanizing agent is deposited. In the latter publication, a soft coating layer which contains no vulcanizing agent is defined as a non-vulcanized coating layer, and the one, which contains the vulcanizing agent but which has not been vulcanized, is defined as an unvulcanized coating layer. Also, in the Publication No. 61-41960, the terms "vulcanized" and "non-vulcanized" are defined the same as above.

Japanese Patent Laid-Open Publication No. 64-35057 discloses a metal gasket which overlays two base plates with beads formed thereon and an intermediate plate disposed therebetween, and discloses, as an embodiment, a metal gasket having two base plates disposed with the tip ends of the beads facing each other with the intermediate plate disposed therebetween.

If two base plates are disposed with the tip ends of the beads facing each other and that two coating layers are formed on both sides of each base plate as disclosed in Japanese Utility model Laid-Open Publication No. 61-41960, the tip end of each bead will be covered by two coating layers to make the gasket as a whole thicker by the total thickness of the coating layers. If the coating layer containing the vulcanizing agent is formed on each base plate, as disclosed in Japanese Utility model Laid-Open Publication No. 1-146064, the coating layer will be vulcanized to be hardened depending upon a storage condition, so that a desirable sealing property may not be obtained for the gasket when in use.

When two base plates are arranged such that the tip ends of the beads face each other to provide a metal gasket, the surfaces of the base plates are smooth, different from the surfaces of the cylinder head and cylinder block, so that it may obtain a proper sealing property without the tip end of each bead covered by a coating layer.

SUMMARY OF THE INVENTION

It is, therefore, an object of the present invention to provide a metal gasket including at least two base plates which define at least an opening and have a bead formed therearound, respectively, and which are disposed such that the tip ends of beads of the base plates face each other. The metal gasket further includes an annular metallic shim and a resilient sealing member deposited at appropriate positions, respectively, to ensure a stable sealing effect around the whole periphery of the opening.

It is another object of the present invention to provide a metal gasket including at least two base plates which define at least an opening and have a bead formed therearound, respectively, and which are disposed such that the tip ends of beads of the base plates face each other, to ensure a stable sealing effect around the whole periphery of the opening, and on which a vulcanized coating layer and/or non-vulcanized coating layer are deposited as thin as possible.

In accomplishing these and other objects, a metal gasket includes a first base plate made of metal which defines at least an opening and a bead protruding from a planar surface of the first base plate. The bead is formed in a manner such that the bead encircles the opening. The metal gasket also includes a second base plate made of metal which defines at least an opening and a bead protruding from a planar surface of the second base plate. Likewise, the bead is formed in a manner such that the bead encircles the opening. The second base plate is disposed in parallel with the first base plate with the tip ends of the beads of the first base plate and second base plate facing each other. An annular metallic shim is secured to the first base plate at the side thereof with the bead protruded therefrom between the inner periphery of the bead and the opening, whereas a resilient sealing member is deposited on the second base plate at the side thereof with the bead protruding therefrom and around the outer periphery thereof.

In the above metal gasket, it is preferable that the thickness of the annular metallic shim is smaller than the thickness of the first base plate, and that the height of bead of the first base plate is smaller than the thickness of the annular metallic shim.

The metal gasket may be arranged to include the first base plate and the second base plate disposed with the tip ends of the beads of the first base plate and second base plate facing each other, a non-vulcanized coating layer which is formed on the whole surface of the second base plate at the side thereof with the bead protruding therefrom, and a resilient sealing member which is deposited on the non-vulcanized coating layer at the side thereof with the bead protruding therefrom around the outer periphery of the bead.

The metal gasket may further include an annular metallic shim which is secured to the first base plate at the side thereof with the bead protruding therefrom between the inner periphery of the bead and the opening, a vulcanized coating layer which is formed on the whole surface of each of the surfaces of the first base plate and second base plate which do not face each other, and a non-vulcanized coating layer which is formed on the whole surface of each vulcanized coating layer.

BRIEF DESCRIPTION OF THE DRAWINGS

The above stated objects and following description will become readily apparent with reference to the accompanying drawings, wherein like reference numerals denote like elements, and in which:

FIG. 1 is a sectional view of a part of a metal gasket of an embodiment according to the present invention;

DESCRIPTION OF THE PREFERRED EMBODIMENTS

Figure 2:
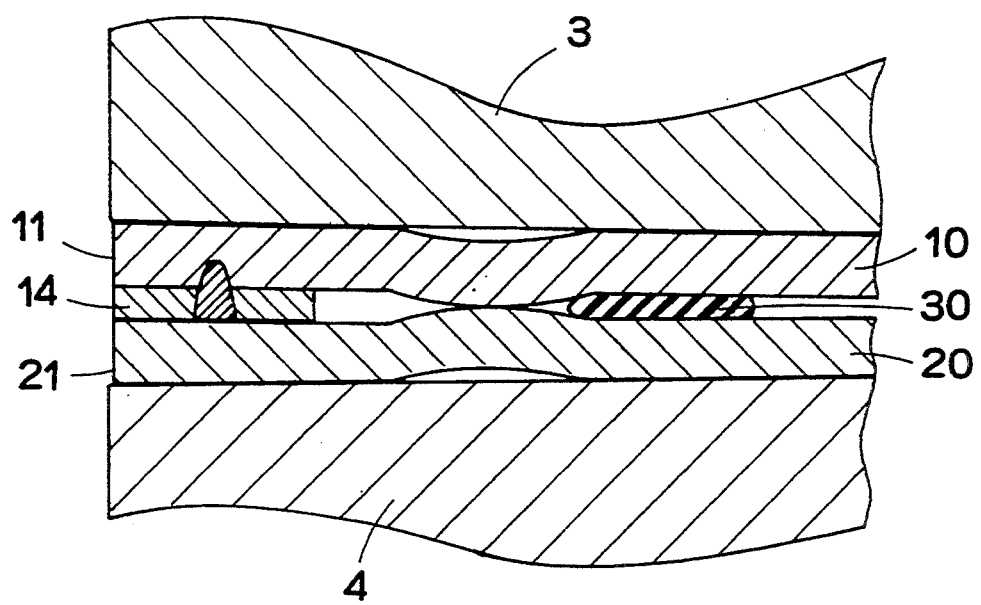
FIG. 2 is a sectional view of a part of a cylinder head and a cylinder block having a metal gasket clamped therebetween according to an embodiment of the present invention.
Figure 3:
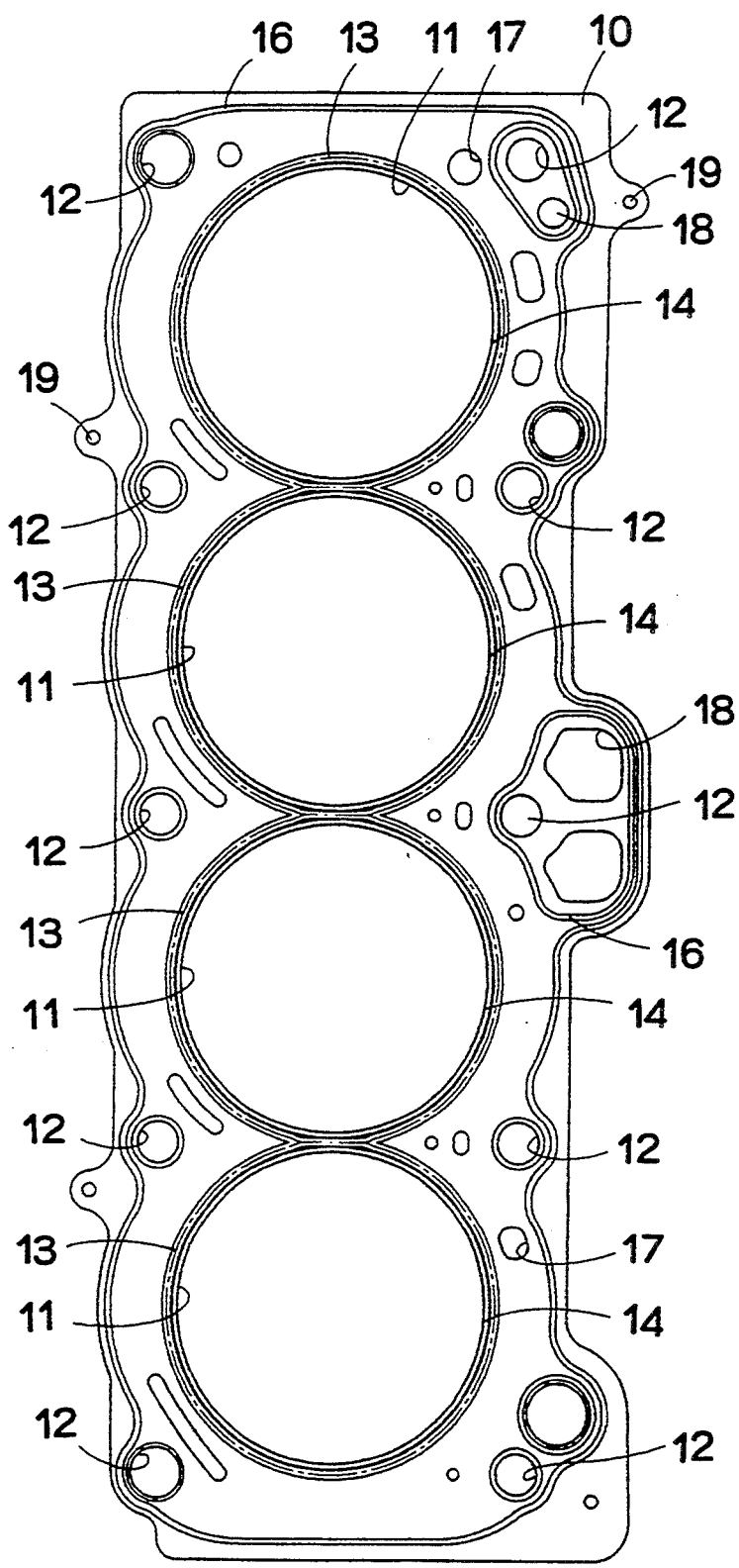
FIG. 3 is a plan view of a first base plate of a metal gasket of an embodiment according to the present invention.
Figure 4:
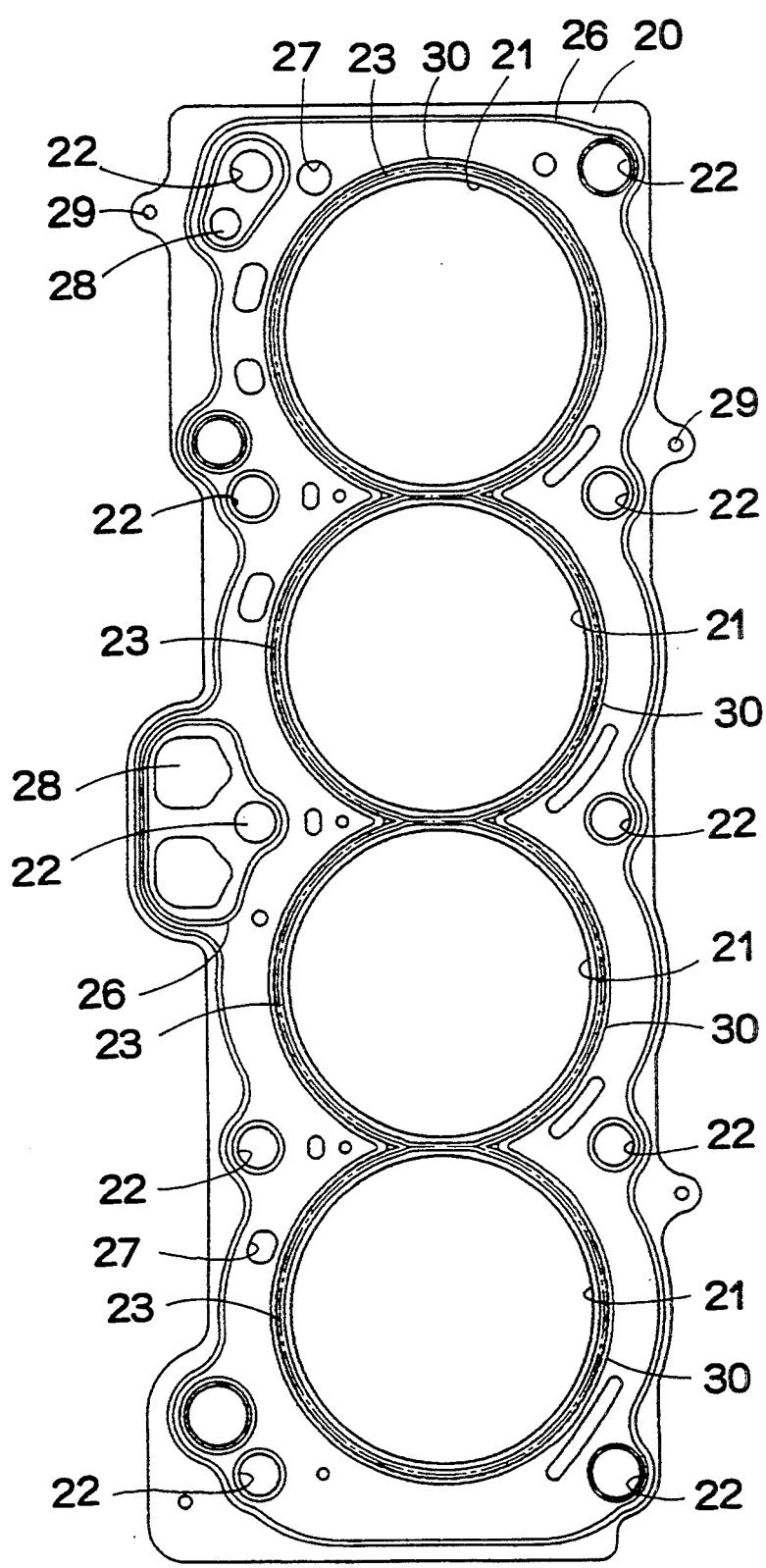
FIG. 4 is a plan view of a second base plate of a metal gasket of an embodiment according to the present invention.

Referring to FIG. 1, there is illustrated a part of a gasket made of metal and used for a multicylinder internal combustion engine according to a first embodiment of the present invention. The metal gasket comprises a first base plate 10 as shown in FIG. 3 and a second base plate 20 as shown in FIG. 4, made of a flat elastic metal, e.g., stainless steel, respectively, and defining a plurality of openings, including combustion openings 11, 21, coolant openings 17, 27 and oil openings 18, 28, as well as a plurality of bolt holes 12, 22 formed around the combustion openings 11, 21, respectively. The bolt holes 12, 22 are formed around the combustion openings 11, 21 at approximately equal spaces, e.g., ten holes in total. Furthermore, in order to connect the first and second base plates 10, 20, caulking holes 19, 29 are formed at the outermost peripheral ends of the base plates, respectively. Each base plate 10, 20 has a plurality of annular beads 13, 23 formed around the respective openings.

The combustion openings 11, 21 are formed such that a certain number of openings corresponding to the number of cylinders (e.g., four openings for a four cylinder in-line engine) are aligned. The beads 13, 23 are embossed around the combustion openings 11, 21 to form annular arcuate configuration. The beads 13, 13 (23, 23) formed around adjacent combustion openings 11, 11 (22, 22) are connected theretogether at a junction, the width of which is smaller than the width of remaining portions of the beads 13, 13 (23, 23).

There is a planar portion extending from the inner periphery of each bead 13 to each combustion chamber 11 surrounded thereby. On each planar portion, an annular metallic shim 14, or an annular spacer made of metal, e.g., stainless steel, is disposed at the side of tip end of the bead 13 protruding from the base plate 10. The shim 14 is formed with a width which is sufficient to provide a sealing effect by itself. The thickness Ts of each shim 14 is smaller than the thickness Tp of the first base plate 10 as shown in FIG. 1, and greater than the height Tb of the bead 13 (i.e., Tp>Ts>Tb). The shim 14 is welded, for example by a laser welding machine, to the first base plate 10 around each combustion opening 11 to form a substantially continuous weld zone 15 around the whole periphery of each shim.

In the present embodiment, the height of the bead 23 is set to be substantially equal to the height of the bead 13, so that the total height 2Tb of the beads 13, 23 will be greater than the thickness Ts of the shim 14. However, each bead 13, 23 may be formed of a height different from each other, provided that the total height of the beads 13, 23 is greater than the thickness Ts of the shim 14. Further, there are beads 16, 26 around the bolt holes 12, 22 and oil openings 18, 28, and along the outer peripheries of the first and second base plates 10, 20. Each bead 16, 26 is formed into a stepped portion or an inclined portion to provide a half of each bead 13, 23, so that it is called as a halfbead. On the second base plate 20 at the tip end's side of the bead 23, a sealing member 30 of vulcanized fluoro rubber is deposited continuously around the whole periphery of each bead 23. The sealing member 30 may be formed by applying to the surface of the second base plate 20 a fluoro rubber which has not been vulcanized with vulcanizing agent added thereinto, then heating it at a predetermined temperature to vulcanize it.

In addition, all the surfaces of the sealing member 30 and the second base plate 20 may be covered with a coating layer of non-vulcanized or unvulcanized fluoro rubber, so as to provide an effective sealing when the gasket is clamped between a cylinder head 3 and a cylinder block 4 as described later. Thus, the unvulcanized coating layer may be formed on the whole surface of the second base plate 20 and the sealing member 30. In this respect, non-vulcanized rubber means rubber which contains no vulcanizing agent, whereas unvulcanized rubber means rubber which contains vulcanizing agent, but has not been vulcanized. The unvulcanized coating layer is of the same characteristic at its initial condition as that of the non-vulcanized coating layer, so that the unvulcanized coating layer is so soft that it will conform to roughness of a contacting surface to provide a good sealing property. Whereas, the unvulcanized coating layer will get vulcanized gradually when in use, so that the unvulcanized coating layer will be hardened to raise its resiliency and provide a tight sealing against the contacting surface. That is, in the middle of its life in use, the unvulcanized coating layer is provided with not only the property for conforming to the roughness of the contacting surface as that of the non-vulcanized coating layer, also the properties of hardness and resiliency as those of the vulcanized coating layer. When the unvulcanized coating layer is used for a long period of time, the same might get vulcanized to become the vulcanized coating layer.

Accordingly, the gasket may be formed as follows. An inner vulcanized coating layer 40 may be formed on the whole surface of the second base plate 20 at the side thereof facing the first base plate 10, and the sealing member 30 may be deposited on the inner vulcanized coating layer around the outer periphery of the bead 23. Furthermore an inner unvulcanized coating layer 41 may be formed on the whole surface of the inner vulcanized coating layer and sealing member 30. Furthermore, an outer vulcanized coating layer 42 may be formed on the whole surface of each of the surfaces of the first base plate 10 and the second base plate 20 which do not face each other, and an outer unvulcanized coating layer 43 may be formed on the whole surface of each outer vulcanized coating layer 42. The thickness of the outer vulcanized coating layer 42 and the outer unvulcanized coating layer 43 may be arranged to be greater than the thickness of the inner vulcanized coating layer 40 and the inner unvulcanized coating layers 41.

The first and second base plates 10, 20 formed as described above and shown in FIGS. 3 and 4 are assembled theretogether with the tip ends of the beads 13, 23 facing each other as shown in FIG. 1, and caulked by rivets (not shown) through the caulking holes 19, 29 to form the metal gasket. Then, the metal gasket as structured above is disposed between the cylinder head 3 and the cylinder block 4, and connecting bolts (not shown) are provided in the bolt holes 12, 22. In the present embodiment, the metal gasket is disposed with its second base plate 20 placed on the cylinder block 4. However, the gasket may be disposed with its first base plate 10 placed on the cylinder block 4.

When a compressive load is caused by the bolts to be applied between the cylinder head 3 and cylinder block 4, the beads 13, 23 of the first and second base plates 10, 20 are compressed and deformed. Since the total height 2Tb of the beads 13, 23 is greater than the thickness Ts of the shim 14, the beads 13, 23 can be deformed until the height 2Tb will become equal to the thickness Ts of the shim 14, but never deformed further.

That is, when the metal gasket is clamped tightly between the cylinder head 3 and cylinder block 4 to compress the shim 14, the beads 13, 23 will not be deformed further. With elastic restoring force caused by the compressed beads 13, 23, therefore, the first base plate 10 and second plate 20 will be clamped tightly between the cylinder head 3 and cylinder block 4. Since the sealing member 30 has been deposited around the outer periphery of the bead 23 at the protruded side thereof, when the cylinder head 3 and cylinder block 4 are clamped, a clearance between the first base plate 10 and second base plate 20 at the outer peripheral side of the beads 13, 23 will be plugged by the sealing member 30. Therefore, the coolant in the coolant openings 17, 27 will never reach the beads 13, 23.

As described in the above, the bead 13 of the first base plate 10 and the bead 23 of the second base plate 20 have been restrained by the shim 14 from being deformed largely, and the deformation resulted therefrom is limited to a small amount, so that sufficient anti-fatigue characteristic will be obtained. Also, since the beads 13, 23 have been protected by the sealing member 30 against the coolant, deterioration due to rust will be avoided. Furthermore, a certain sealing effect is ensured by the shim 14 itself, so that three stages of sealing will be achieved by the shim 14, beads 13, 23 and sealing member 30 to ensure a stable sealing effect.

Figure 5:
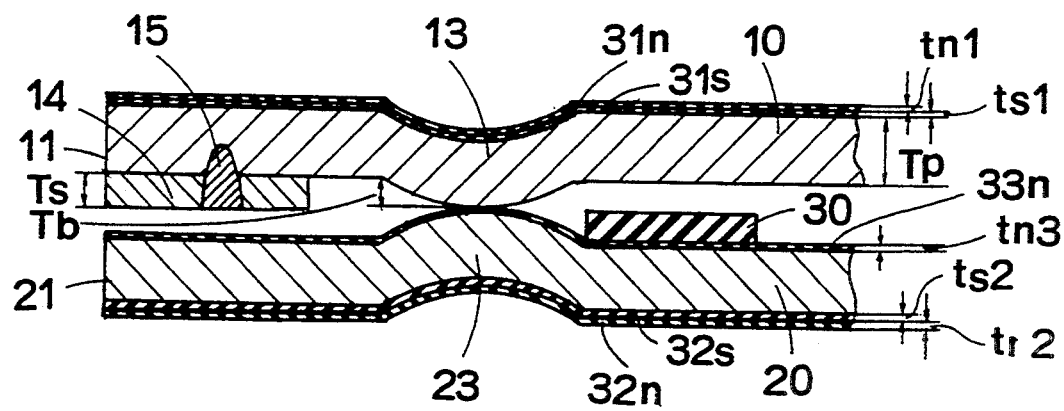
FIG. 5 is a sectional view of a part of a metal gasket of another embodiment according to the present invention.
Figure 6:
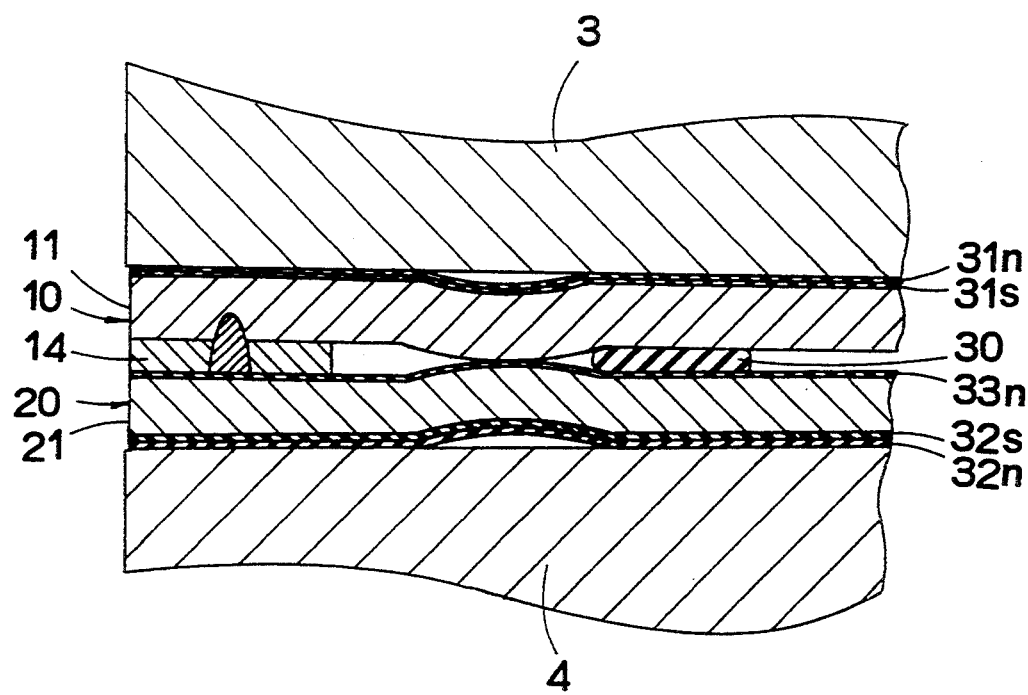
FIG. 6 is a sectional view of a cylinder head and a cylinder block having a metal gasket clamped therebetween according to another embodiment of the present invention.
Figure 7:
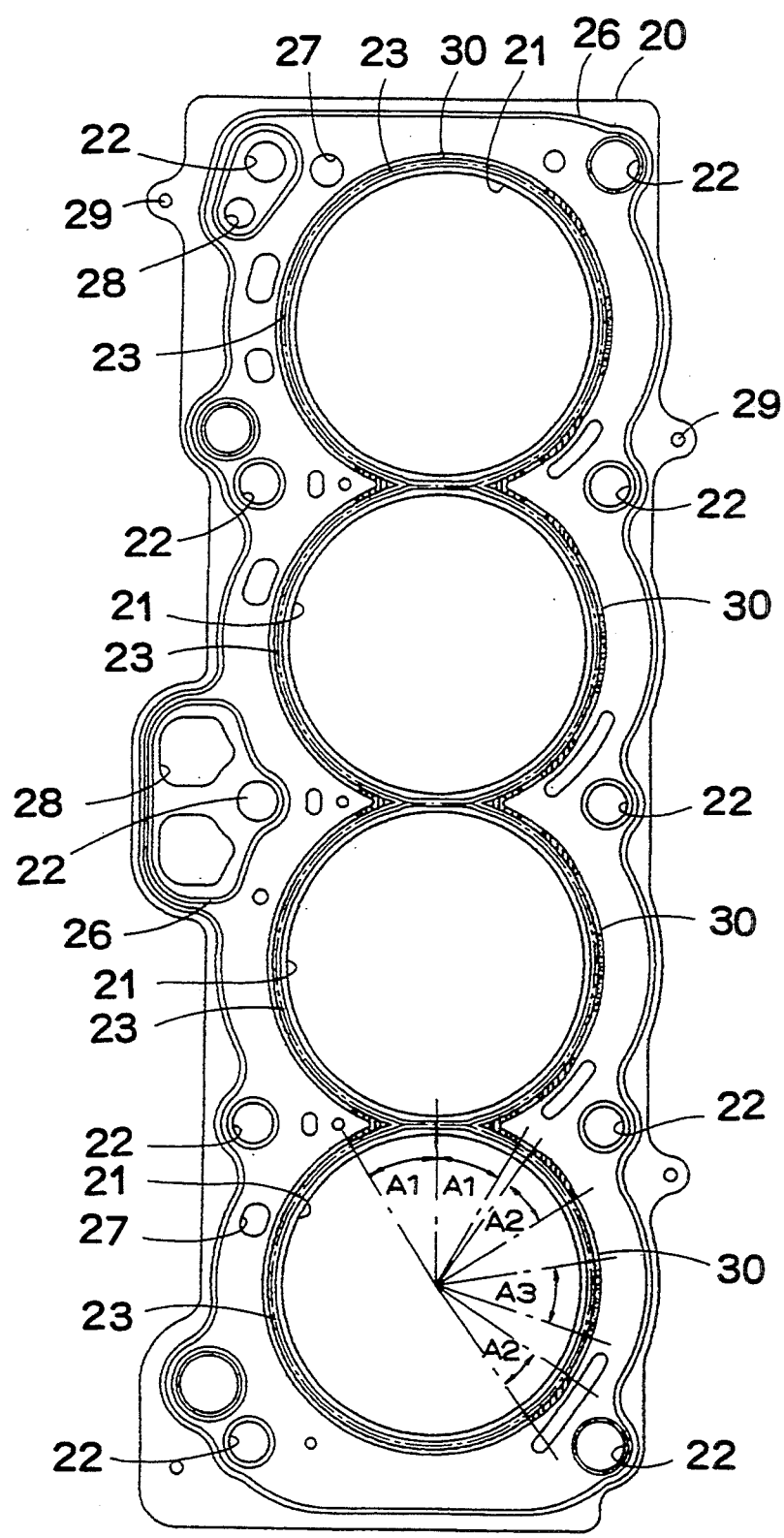
FIG. 7 is a plan view of a second base plate of a metal gasket of another embodiment according to the present invention.

FIGS. 5–7 illustrate another embodiment of the present invention. In the following description, structural elements similar to those described above will be designated by corresponding reference numerals. In this embodiment, while the surface of the first base plate 10 at the tip end's side of the bead 13 is a material surface, the surface of its reverse side is covered with an outer vulcanized coating layer 31s of vulcanized fluoro rubber, and deposited thereon is an outer non-vulcanized coating layer 31n of non-vulcanized fluoro rubber. The outer non-vulcanized coating layer 31n may be substituted by a coating layer of unvulcanized fluoro rubber. A plan view of the first base plate 10 in this embodiment is the same as the one as shown in FIG. 3, while the second base plate 20 is formed as shown in FIG. 7.

On the surface of the second base plate 20 at the reverse side to the tip end's side of the bead 23, an outer vulcanized coating layer 32s is formed and an outer non-vulcanized coating layer 32n is laid thereon. The outer non-vulcanized coating layer 32n may be substituted by a coating layer of unvulcanized fluoro rubber. Further, an inner non-vulcanized coating layer 33n is deposited on the surface of the second base plate 20 at the tip end's side of the bead 23, and the surface of the bead 23 as well. In addition, on the surface of second base plate 20 at the tip end's side of the bead 23, the sealing member 30 of vulcanized fluoro rubber is formed continuously around the whole periphery of each bead 23 in the same manner as in the embodiment described before. Since the inner non-vulcanized coating layer 33n contains no vulcanizing agent, when the sealing member 30 is heated to be formed as described before, the layer 33n will not be vulcanized to enable the same maintain its soft condition.

The dimensional relation among the above-described coating layers is determined in accordance with various factors, preferably as follows. The thickness ts1 outer vulcanized coating layer 31s deposited on the first base plate 10 is smaller than the thickness ts2 of the outer vulcanized coating layer 32s deposited on the second base plate 20, and the thickness tn1 of the outer non-vulcanized coating layer 31n is smaller than the thickness tn2 of the outer non-vulcanized coating layer 32n (ts1<ts2, tn1<tn2), so that the total thickness of the coating layers deposited on the second base plate 20 is greater than that of the coating layers deposited on the first base plate 10. The thickness tn3 of the inner non-vulcanized coating layer 33n is equal to the thickness ts1 of the outer vulcanized coating layer 31s. While the thickness of the sealing member 30 is approximately equal to the height of the bead 23, the former may be made greater or smaller than the latter. The thickness of the sealing member 30 may even, or different along the periphery of the bead 23. As shown in FIG. 5, the sealing member 30 is disposed on the second base plate 20 from a border of the bead 23 to a certain position away from the bead 23 in the radial direction. However, the sealing member 30 may be disposed such that a portion thereof overlaps a border portion of the bead 23.

It is preferable that the thickness of the sealing member 30 is gradually changed along its periphery. That is, at the intake ports side of the second base plate 20, i.e., the right side in FIG. 7, the thickness of a portion of the sealing member 30 facing an intermediate portion between the adjacent combustion openings 21, 21, i.e., a portion of the sealing member 30 positioned in a region within a certain central angle A1 (e.g., 30°) of the combustion opening 21 from a center of the intermediate portion, as illustrated by crosshatching in FIG. 7, increases gradually toward the center of the central angle A1. Whereas, it is so arranged that the thickness of a portion of the sealing member 30 near the bolt hole 22, i.e., a portion of the sealing member 30 positioned in a region within a central angle A2 (e.g., 20°) of the combustion opening 21, decreases gradually toward the center of the central angle A2. Further, it is so arranged that the thickness of a portion of the sealing member 30 between the adjacent bolt holes 22, 22 positioned in a region within a central angle A3 (e.g., 30°), as dotted in FIG. 7, increases gradually toward the center of the central angle A3. The width of the sealing member 30 may be made different along the periphery thereof.

At the exhaust ports side of the second plate 20, i.e., the left side in FIG. 7, the width and the thickness of a portion of the sealing member 30 facing the intermediate portion between the adjacent combustion openings 21, 21, i.e., a portion of the sealing member 30 positioned in a region within the central angle A1, increase gradually toward the center of the central angle A1, while those of the remaining portion are approximately even.

The first and second base plates 10, 20 formed as described above and shown in FIGS. 3 and 7 are assembled theretogether with the tip ends of the beads 13, 23 facing each other as shown in FIG. 5, and caulked by rivets through the caulking holes 19, 29 to form the metal gasket. Since the inner non-vulcanized coating layer 33n is disposed between the the tip ends of the beads 13, 23, the tip ends' surfaces will not be damaged, and even minor roughness of the surfaces will be absorbed by the inner non-vulcanized coating layer 33n to maintain a sealing contact.

The metal gasket structured as described above is disposed between the cylinder head 3, which is made of aluminium die-cast alloy for example, and the cylinder block 4, which is made of cast iron, with its right side in FIG. 7 positioned at the intake ports side and with its left side in FIG. 7 positioned at the exhaust ports side. Therefore, the outer vulcanized coating layer 31s and outer non-vulcanized coating layer 31n are disposed between the first base plate 10 and the cylinder head 3, while the outer vulcanized coating layer 32s and outer non-vulcanized coating layer 32n are disposed between the second base plate 20 and the cylinder block 4. The connecting bolts (not shown) are inserted into the bolt holes 12, 22. When a clamping force is applied between the cylinder head 3 and cylinder block 4, the outer non-vulcanized coating layers 31n, 32n will tightly contact both the contacting surfaces of the cylinder head 3 and cylinder block 4. The contacting surface of the cylinder block 4 made of cast iron is greater in roughness than the contacting surface of the cylinder head 3. Since the outer non-vulcanized coating layer 32n is made thicker than the outer non-vulcanized coating layer 31n, the roughness will be absorbed effectively.

The sealing member 30 is formed with appropriate thickness and width at both the intake ports side and exhaust ports side in accordance with a distribution of clamping force applied to the metal gasket as described above, so that a substantially even distribution of sealing pressure will be obtained around the whole periphery of each combustion opening 11. And, the sealing member 30 has been vulcanized, so that the sealing member 30 will not be damaged by fatigue and will thus maintain its sealing effect for a long period of time.

While the metal gasket is disposed with its second base plate 20 placed on the cylinder block 4 in this embodiment, the gasket may be disposed with its first base plate 10 placed on the cylinder block 4. In this case, however, it is preferable that the thickness of outer vulcanized coating layer 31s the outer non-vulcanized coating layer 31n of the first base plate 10 are formed thicker than outer vulcanized coating layer 32s outer non-vulcanized coating layer 32n of the second base plate 20. The sealing member 30 may be disposed not only around the combustion opening 21, but also at the outer side of the coolant openings 17, 27 so as to encompass them. Or, it may be so arranged that the sealing member 30 is disposed only at the outer side of the coolant openings 17, 27.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. A metal gasket comprising:
    a first base plate made of metal and having at least an opening formed therein and a first bead formed around the opening, said first bead protruding from a planar surface of said first base plate;
    a second base plate made of metal having at least an opening formed therein and a second bead formed around the opening, said second bead protruding from a planar surface of said second base plate, said second base plate being disposed in parallel with said first base plate with respective tip ends of said first and second beads facing each other;
    an annular metallic shim secured to said first base plate on said planar surface of said first base plate from which said first bead protrudes, wherein said annular metallic shim is secured between the inner periphery of said first bead and said opening; and
    a resilient sealing member deposited on said second base plate on said planar surface of said second base plate from which said second bead protrudes, wherein said resilient sealing member is deposited around the outer periphery of said second bead.

2. A metal gasket as set forth in claim 1, wherein the total combined height of said first and second beads in an uncompressed state is greater than the thickness of said annular metallic shim.

3. A metal gasket as set forth in claim 1, wherein the thickness of said annular metallic shim is smaller than the thickness of said first base plate.

4. A metal gasket as set forth in claim 3, wherein the height of said first bead in an uncompressed state is smaller than the thickness of said annular metallic shim.

5. A metal gasket as set forth in claim 1, further comprising an unvulcanized coating layer formed on the entire surface of said second base plate and said resilient sealing member.

6. A metal gasket as set forth in claim 1, further comprising:
    an inner vulcanized coating layer formed on the entire surface of said second base plate at the side thereof facing said first base plate, said resilient sealing member being deposited on said inner vulcanized coating layer around the outer periphery of said second bead; and
    an inner unvulcanized coating layer formed on the entire surface of said inner vulcanized coating layer and said resilient sealing member.

7. A metal gasket as set forth in claim 6, further comprising:
    an outer vulcanized coating layer formed on the entirety surface of each of the surfaces of said first base plate and said second base plate which do not face each other; and
    an outer unvulcanized coating layer formed on the entire surface of each outer vulcanized coating layer.

8. A metal gasket as set forth in claim 7, wherein the combined thickness of said outer vulcanized coating layer and said outer unvulcanized coating layer is greater than the combined thickness of said inner vulcanized coating layer and said inner unvulcanized coating layer.

9. A metal gasket as set forth in claim 6, wherein said resilient sealing member is made of vulcanized fluoro rubber.

10. A metal gasket as set forth in claim 1, further comprising an inner non-vulcanized coating layer formed on the entire surface of said second base plate at the side thereof with said second bead protruded, said resilient sealing member being deposited on said inner non-vulcanized coating layer at the side of said second base plate with said second bead and around the outer periphery of said second bead.

11. A metal gasket as set forth in claim 10, wherein said resilient sealing member is made of vulcanized fluoro rubber.

12. A metal gasket as set forth in claim 1, further comprising:
    an outer vulcanized coating layer formed on the entirety of each of the surfaces of said first base plate and second base plate which do not face each other; and
    an outer non-vulcanized coating layer formed on the entire surface of each outer vulcanized coating layer.

13. A metal gasket as set forth in claim 12, wherein the combined thickness of said outer vulcanized coating layer and said outer non-vulcanized coating layer formed on the surface of one of said first base plate and said second base plate, which contacts a rougher surface than the other of said first base plate and said second base plate, is greater than the combined thickness of said outer vulcanized coating layer and said outer non-vulcanized coating layer formed on the surface of the other of said first base plate and said second base plate.

14. A metal gasket as set forth in claim 13, wherein the combined thickness of said outer vulcanized coating layer and said outer non-vulcanized coating layer formed on the surface of said second base plate is greater than the combined thickness of said vulcanized coating layer and said non-vulcanized coating layer formed on the surface of said first base plate.

15. A metal gasket as set forth in claim 13, wherein said metal gasket is disposed between a cylinder head and a cylinder block of an internal combustion engine, said first base plate being positioned to contact said cylinder head, and said second base plate being positioned to contact said cylinder block.

16. A metal gasket as set forth in claim 10, further comprising;
    an outer vulcanized coating layer formed on the entirety of each of the surfaces of said first base plate and second base plate which do not face each other; and
    an outer unvulcanized coating layer formed on the entire surface of each outer vulcanized coating layer.

17. A metal gasket as set forth in claim 16, wherein the combined thickness of said outer vulcanized coating layer and said outer unvulcanized coating layer formed on the surface of said second base plate is greater than the combined thickness of said outer vulcanized layer and said outer unvulcanized layer formed on the surface of said first base plate.

18. A metal gasket disposed between a cylinder head and a cylinder block of a multicylinder internal combustion engine having a plurality of cylinders arranged in series comprising:
- a first base plate made of metal having a plurality of combustion openings corresponding to said cylinders formed therein and first beads protruding from a planar surface of said first base plate formed around said combustion openings;
- a second base plate made of metal having a plurality of combustion openings, corresponding to said cylinders formed therein and second beads protruding from a planar surface of said second base plate formed around said combustion openings, said second base plate being disposed in parallel with said first base plate with respective tip ends of said first and second beads facing each other;
- annular metallic shims secured to said first base plate on said planar surface of said first base plate from which said first beads protrude, wherein said annular metallic shim is secured between the inner periphery of said first beads and said combustion openings, respectively; and
- a resilient sealing member deposited on said second base plate on said planar surface of said second base plate from which said second beads protrude, wherein said resilient member is deposited around each outer periphery of said second beads, and at a junction where two of said second beads meet, said sealing member having a first portion of different dimension with respect to remaining portions thereof.

19. A metal gasket as set forth in claim 18, wherein the thickness of said first portion of said resilient sealing member located at said junction is greater than the thickness of said remaining portions.

20. A metal gasket as set forth in claim 19, wherein said resilient sealing member is made of vulcanized fluoro rubber.

21. A metal gasket as set forth in claim 18, wherein said resilient sealing member located at a side thereof near intake ports of said internal combustion engine has a first region of a first central angle facing said junction, the thickness of said sealing member in said first region increasing gradually toward the center of said first region.

22. A metal gasket as set forth in claim 18, wherein said second base plate has a plurality of bolt holes defined around said combustion openings, and wherein said resilient sealing member located at a side thereof near intake ports of said internal combustion engine has a second region of a second central angle facing each of said bolt holes, the thickness of said sealing member in said second region decreasing gradually toward the center of said second region.

23. A metal gasket as set forth in claim 22, wherein said resilient sealing member located at a side thereof near intake ports of said internal combustion engine has a third region of a third central angle between adjacent bolt holes, the thickness of said sealing member in said third region increasing gradually toward the center of said third region.

* * * * *